US007847962B2

(12) United States Patent
Yorimoto et al.

(10) Patent No.: US 7,847,962 B2
(45) Date of Patent: Dec. 7, 2010

(54) E-MAIL PRINTING DEVICE AND E-MAIL PRINTING SYSTEM AND CONFIRMATION NOTIFYING METHOD AND STORAGE MEDIUM STORING CONFIRMATION NOTIFYING PROGRAM

(75) Inventors: Kouji Yorimoto, Saitama (JP); Hidetaka Hama, Saitama (JP); Yasushi Sakata, Saitama (JP); Tsuyoshi Mizoi, Saitama (JP); Ryuji Inaba, Saitama (JP); Hironori Niwa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1103 days.

(21) Appl. No.: 11/202,215

(22) Filed: Aug. 12, 2005

(65) Prior Publication Data
US 2006/0158681 A1 Jul. 20, 2006

(30) Foreign Application Priority Data
Jan. 20, 2005 (JP) ............................. 2005-012816

(51) Int. Cl.
G06F 3/12 (2006.01)
(52) U.S. Cl. ........................ 358/1.15; 709/206; 709/223
(58) Field of Classification Search .................. 358/402, 358/1.15
See application file for complete search history.

(56) References Cited
U.S. PATENT DOCUMENTS

| 6,823,367 B1 * | 11/2004 | Wakasugi et al. | 709/206 |
| 2002/0143924 A1 * | 10/2002 | Iga | 709/223 |
| 2005/0198143 A1 * | 9/2005 | Moody et al. | 709/206 |

FOREIGN PATENT DOCUMENTS

| JP | A-05-002541 | 1/1993 |
| JP | A 08-130554 | 5/1996 |
| JP | A 09-247335 | 9/1997 |
| JP | A-10-023062 | 1/1998 |
| JP | A-11-306098 | 11/1999 |
| JP | A-2000-261640 | 9/2000 |
| JP | A-2001-051934 | 2/2001 |
| JP | A-2001-243316 | 9/2001 |
| JP | A-2002-111946 | 4/2002 |

(Continued)

OTHER PUBLICATIONS

Mar. 30, 2010 Refusing Reason Notice issued in Japanese Patent Application No. 2005-012816 (with translation).

Primary Examiner—King Y Poon
Assistant Examiner—Qian Yang
(74) Attorney, Agent, or Firm—Oliff & Berridge, PLC

(57) ABSTRACT

An e-mail print processing device that performs printing of an e-mail and a file attached to the e-mail received via a network, including: a reception history storage unit that stores a reception history of e-mails; a display unit that displays a list of the reception history of the e-mails stored in the reception history storage unit; a selection unit that selects by a user's operation an e-mail of which printing is confirmed from the reception history list of the e-mails displayed by the display unit; a confirmation notice generation unit that generates a confirmation notice of the e-mail selected by the selection unit; and a confirmation notice sending unit that sends the confirmation notice generated by the confirmation notice generation unit.

7 Claims, 10 Drawing Sheets

FOREIGN PATENT DOCUMENTS

| | | |
|---|---|---|
| JP | A-2003-125000 | 4/2003 |
| JP | A-2004-054497 | 2/2004 |
| JP | A-2004-151783 | 5/2004 |
| JP | A-2004-349987 | 12/2004 |
| WO | WO 01-48615 A1 | 7/2001 |

* cited by examiner

| RECEPTION HISTORY CONTROL NUMBER | RECIPIENT ADDRESS (to:) | SENDER ADDRESS (from:) | RETURN ADDRESS (reply to:) | RECEIVED DATE AND TIME | DATA SIZE | STATE OF CONFIRMATION NOTICE |
|---|---|---|---|---|---|---|
| A_12345 | res@test1.mail.ne.jp | send@test2.mail.ne.jp | send_rep@test2.mail.ne.jp | 2004/10/07 13:08:27 | 32K | SENT |
| K_56789 | resp@jet01.mail.ne.jp | send@test2.mail.ne.jp | — | 2004/10/15 09:12:55 | 128K | UNSENT |
| J_24680 | 233.64.xxx.xxx | 214.36.xxx.xxx | — | 2004/11/03 22:58:06 | 1277K | UNSENT |

FIG.3

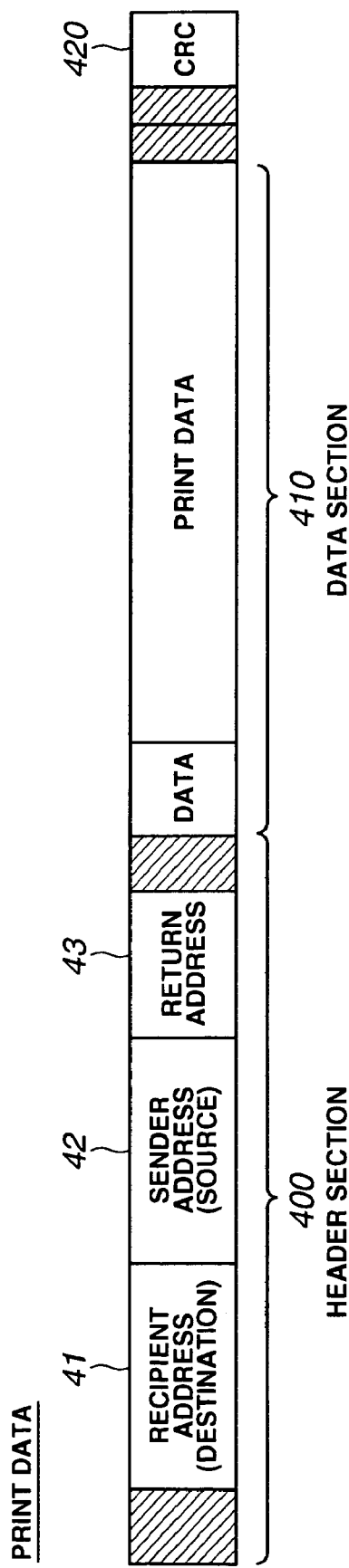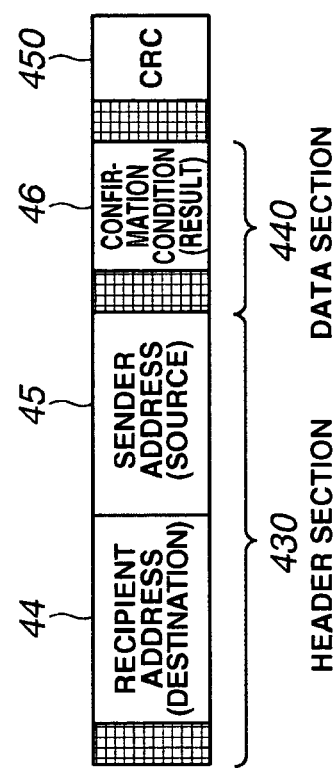
FIG.4A
FIG.4B

FIG.10

| MANAGEMENT INFORMATION 1001 | PRINT REQUESTED DATE AND TIME 1002 | DESTINATION 1003 | CONFIRMATION NOTICE RECEIVED OR NOT 1004 | CONFIRMATION NOTICE RECEIVED DATE AND TIME 1005 |
|---|---|---|---|---|
| MANAGEMENT INFORMATION A | 2004/11/10 13:05:22 | 233.55.XXX.XXX | RECEIVED | 2004/11/10 22:58:20 |
| MANAGEMENT INFORMATION B | 2004/11/11 20:39:12 | 64.123.XXX.XXX | UNRECEIVED | — |
| MANAGEMENT INFORMATION C | 2004/11/11 21:07:08 | 123.58.XXX.XXX | UNRECEIVED | — |

//

E-MAIL PRINTING DEVICE AND E-MAIL PRINTING SYSTEM AND CONFIRMATION NOTIFYING METHOD AND STORAGE MEDIUM STORING CONFIRMATION NOTIFYING PROGRAM

BACKGROUND OF THE INVENTION

1. Field of the Invention

The present invention relates to an e-mail printing device, an e-mail printing system, a confirmation notifying method and a storage medium storing a confirmation notifying program which makes it possible to confirm the content of a printed document, and more particularly to an e-mail printing device, an e-mail printing system, a confirmation notifying method and a storage medium storing a confirmation notifying program which makes it possible for a sender to recognize without fail that the content of a document received by an e-mail and printed out has been confirmed.

2. Description of the Related Art

Generally, with a device or a system for printing out received data by, for example, automatic printing of a file sent by an Internet facsimile or a network scanner or a file attached to an e-mail, an output document cannot be securely confirmed by a sender. Therefore, the sender needs to confirm with the recipient by using another means such as a telephone, a messenger or the like.

It is therefore necessary to use such means to check every time a document is sent, but they cannot be used to send and receive information which requires communications in real time, and it is also difficult to use them to send and receive highly important information such as information desired to be transmitted without fail.

There is a related art disclosed in Japanese Patent Application Laid-Open No. 09-247335 that a receipt confirmation notice indicating the reception of an e-mail is sent to the sender of the e-mail, so that the sender can check whether the destination party has received the e-mail.

According to the related art disclosed in Japanese Patent Application Laid-Open No. 09-247335, in an environment where there are a system (personal computer) using the Internet and a system (facsimile device) using a public line other than the Internet, it is possible to receive an original by either of the systems, and a printing process and the like of an e-mail by the Internet can be made efficiently.

And, as a related art, Japanese Patent Application Laid-Open No. 08-130554 discloses a technique which makes it possible to securely know whether or not the content, which is requested to be printed by an e-mail, has been printed normally by a designated printing device.

The related art disclosed in Japanese Patent Application Laid-Open No. 08-130554 generates a record which is associated with a mail identifier of the e-mail with regard to the print processing result of printout, writes it in an intermediate file, reads the record from the intermediate file, generates a delivery report or an undelivery report according to the content of the results of the determined print processing, and notifies the sender.

But, according to the related art disclosed in Japanese Patent Application Laid-Open Nos. 09-247335 and 08-130554, it can be checked whether the content of e-mail or the like which is requested to be printed has been output without fail, but it cannot be recognized whether the content of the output document is confirmed securely by the recipient designated as the destination, and the transmission of a document with high importance must be checked separately by means of a telephone or the like.

SUMMARY OF THE INVENTION

The present invention has been made in view of the above circumstances and provides an e-mail printing device, an e-mail printing system, a confirmation notifying method and a confirmation notifying program which make it possible that the confirmation of the content of a printed document can be recognized by a simple operation effected by a user.

An aspect of the present invention provides an e-mail print processing device that performs printing of an e-mail and a file attached to the e-mail received via a network, the device including: a reception history storage unit that stores a reception history of e-mails; a display unit that displays a list of the reception history of the e-mails stored in the reception history storage unit; a selection unit that selects by a user's operation an e-mail of which printing is confirmed from the reception history list of the e-mails displayed by the display unit; a confirmation notice generation unit that generates a confirmation notice of the e-mail selected by the selection unit; and a confirmation notice sending unit that sends the confirmation notice generated by the confirmation notice generation unit.

BRIEF DESCRIPTION OF THE DRAWINGS

Embodiments of the present invention will be described in detail based on the following figures, wherein:

FIG. 3 is a structure view showing an example of a reception history;

FIG. 4A and FIG. 4B are views showing formats of sent and received data using an e-mail function;

FIG. 10 is a view showing an example of a transmission history.

DETAILED DESCRIPTION OF THE INVENTION

Embodiments of an e-mail printing device, an e-mail printing system, a confirmation notifying method and a confirmation notifying program according to the present invention will be described in detail with reference to the accompanying drawings.

Figure 7:
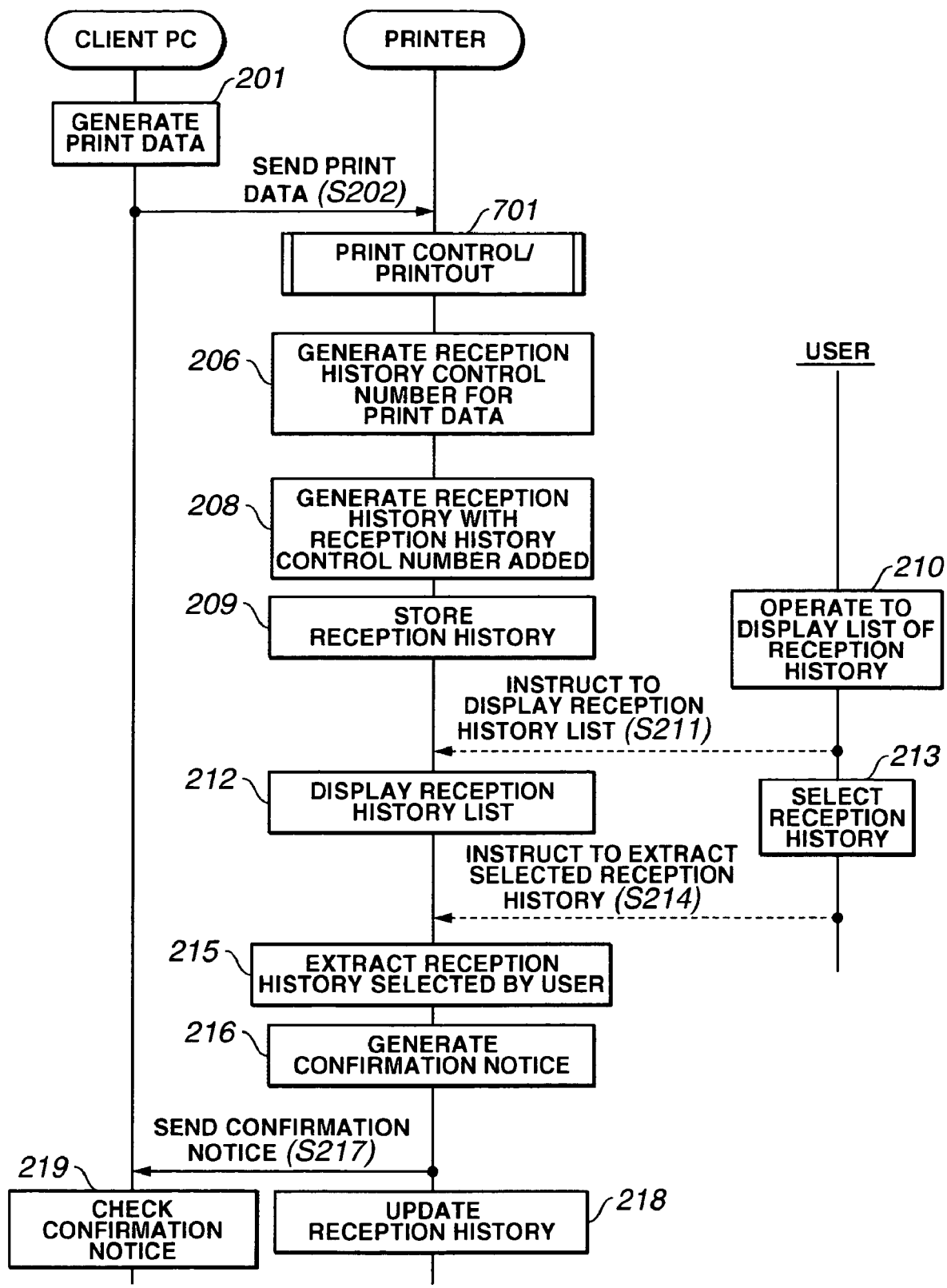
FIG. 7 is a sequence view of sending a confirmation notice by a printer.

In the embodiments described below, it is configured to realize the present invention by a print server which is disposed to control printing, but it may be configured to realize the present invention by a printer without disposing a print server. An example of practicing the present invention by using a printer is shown in FIG. 7.

In addition, as a method of making a print data printing request, it is also possible to print out according to an ordinary printing request in addition to printout of the main body of e-mail and its attachment file by requesting by using an e-mail function.

Embodiment 1

Figure 1:
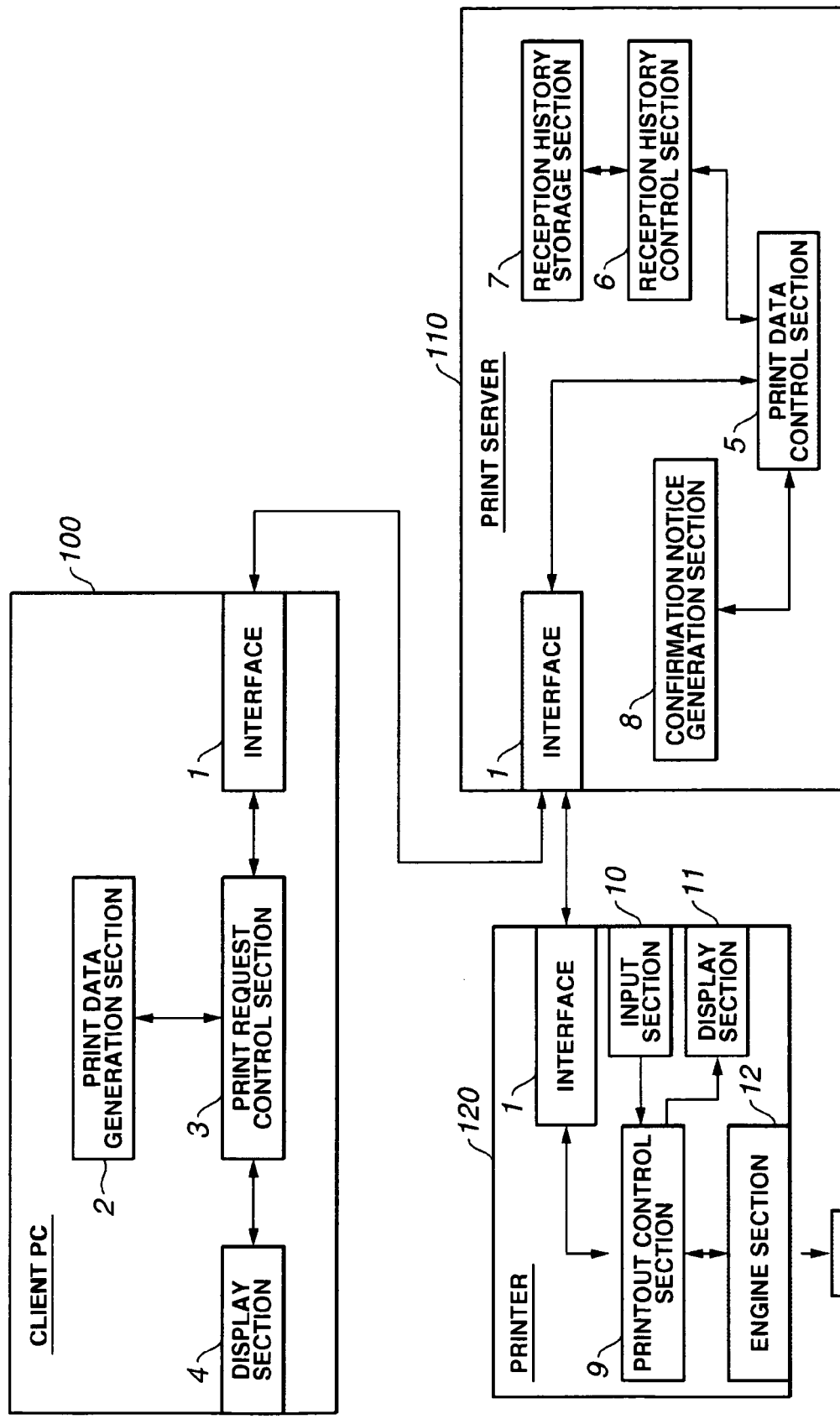
FIG. 1 is a view of a system structure configured by applying an e-mail printing device and an e-mail printing system and a confirmation notifying method and a confirmation notifying program according to the present invention.

FIG. 1 is a view of a system structure configured by applying an e-mail printing device, an e-mail printing system, a confirmation notifying method and a confirmation notifying program according to a first embodiment of the present invention.

In FIG. 1, the e-mail printing system includes a client PC 100 which is a device to make a printing request, a print server 110 which is a device to control printing according to the printing request from the client PC 100 and a printer 120 that outputs print data according to an instruction form the print server 110. These devices are connected by a communication line such as a network line, a public line or the like. It is needless to say that devices (network devices, various types of processing servers, etc.) (not shown) that perform prescribed processing are disposed appropriately on the communication line to which these nodes are connected.

In this e-mail printing system, the print data, which the client PC 100 has requested to print, is controlled by the print server 110 and can be printed out by the printer 120. It can also output the print data of an Internet facsimile and a network scanner function in addition to the print data sent as an e-mail as described above.

The client PC 100 is provided with an interface 1, a print data generation section 2, a printing request control section 3 and a display section 4. The interface 1 is an external interface to realize communications with the print server 110 and connected by a network line, a USB (Universal Serial Bus) line and the like.

The print data generation section 2 generates print data which is requested to be printed. It uses various applications to generate electronic data, stores the data in a memory and converts it into print data which is requested to be printed.

The printing request control section 3 controls the print data generated by the print data generation section 2. For example, it designates a printer for printing and various types of print setting information. The print data, which is requested to be printed, at this time is configured as the main body or an attachment file of an e-mail.

To send the print data by using the e-mail function, an e-mail software is activated, a printing requested side is designated as destination, and the print data, which is requested to be printed, is sent as the main body or attachment file of the e-mail.

The display section 4 is a user interface to be used to generate print data to be printed and to generate print data by the print data generation section 2.

Thus, the client PC 100 can make an output request of general printout, Internet facsimile, network scanner, e-mail or the like.

Then, the print server 110 includes an interface 1, a print data control section 5, a reception history control section 6, a reception history storage section 7 and a confirmation notice generation section 8.

The interface 1 is an external interface which realizes communications in the same manner as described above and realizes connection with nodes of the client PC 100 and the printer 120.

The print data control section 5 analyzes the print data accepted from the client PC 100 and identifies a source address which is an address of a sender having made a printing request, a return address designated as an address of the return address, the content of print data itself and the like. When the print data is sent as the main body or an attachment file of e-mail from the client PC 100, the main body or the attachment file is identified and analyzed as print data. For the source address and the return address to be identified, information indicated in the header of the e-mail is used.

In addition, the print data control section 5 instructs the reception history control section 6 to generate a reception history according to the received printing request. The print data according to which the reception history is generated is converted into a format for printing out by the printer 120 and sent via the interface 1.

When a printout completion notice is received from the printer 120, it is judged that the printout of the print data is completed normally, and a confirmation notice generation request is sent to the confirmation notice generation section 8. The destination address of the generated confirmation notice is obtained from the print data reception history and sent to the client PC designated as destination. At this time, information about whether the confirmation notice has been sent or not is updated in the reception history of the reception history storage section 7.

The reception history control section 6 generates the print data reception history according to the reception history generation instruction from the print data control section 5. At this time, information to be managed as the reception history includes a sender address having made a printing request, a return address, a recipient address, received date and time and the like, and the generated reception history is stored in the reception history storage section 7.

The generated reception history may be stored with management information added. For example, a reception history control number capable of uniquely identifying the reception history is generated as the management information by the reception history control section 6 and managed in association with the reception history. In this case, the print data, which is requested to be printed, is printed with the generated reception history control number added.

The reception history storage section 7 manages to store the reception history generated by the reception history control section 6. The managed and stored reception history can be updated, added or deleted by controlling the reception history by the reception history control section 6. The information to be stored as the reception history includes an item which can be used to check the notification conditions of the confirmation notice.

The confirmation notice generation section 8 generates a confirmation notice upon receiving an instruction to generate the confirmation notice, which is received from the print data control section 5 and indicates that the content of the printed document has been checked.

And, the printer 120 includes the interface 1, a printout control section 9, an input section 10, a display section 11 and an engine section 12 and performs printout. At this time, even if the management information given by the reception history control section 6 and print data are sent by different jobs, they can be output separately.

The interface 1 accepts a print instruction from the print server 110.

The printout control section 9 performs print control such as sequence control of the received print data. When the print instruction is given to the engine section 12 and the printout is completed, a printout completion notice is sent to the print data control section 5 of the print server 110.

Data input through the input section 10 can be accepted and analyzed to control printing. For example, when a reception history display instruction is input through the input section 10, a list of the reception histories stored by the reception history storage section 7 of the print server 110 is generated and shown on the display section 11.

The input section 10 is a user interface which shows a control panel and can send an instruction from a user to the printer. The user can check a printed document, give an instruction to show the reception history to send a confirmation notice to a printing requesting source and select a desired reception history from the displayed reception history list.

At this time, when the reception history of the printed document, which is given a reception history control number which is management information generated by the reception history control section 6, is selected, the reception history can be specified easily by inputting the reception history control number.

The display section 11 is configured of an LCD (Liquid Crystal Display) or the like and shows information which is controlled by the printout control section 9 according to the instruction by the user input through the input section 10. For example, when a reception history display instruction is input through the input section 10, the reception history list is displayed.

The engine section 12 prints the print data controlled by the printout control section 9 and outputs a printed document.

By configuring as described above, a confirmation notice for print data is generated by selecting the reception history generated for each print data which is requested to be printed.

Figure 2:
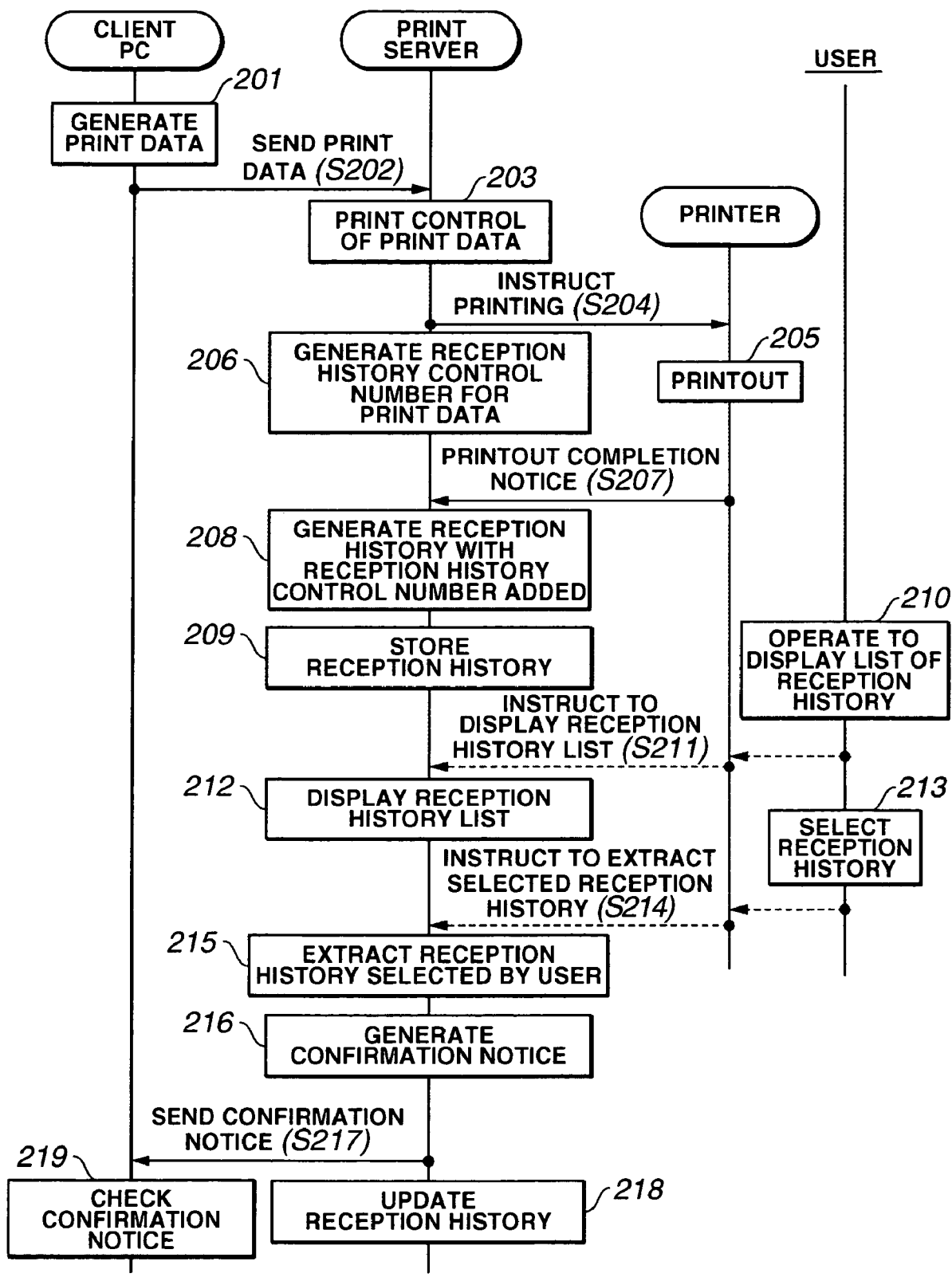
FIG. 2 is a sequence view showing a flow of sending a confirmation notice of a printed document of an e-mail printing system according to the present invention.

FIG. 2 is a sequence view showing a flow of sending a confirmation notice of a printed document of the e-mail printing system according to the present invention.

In FIG. 2, the user generates print data (S201) and sends the print data to the print server (S202), and the print server having received the print data controls printing (S203) and sends a printing instruction to the printer (S204). The printer prints out the print data (S205) and sends a printout completion notice as an output result to the print server (S207).

When a print data printout instruction is sent to the printer, the print server also generates a reception history control number which is used to manage the printing request reception history (S206). The reception history is generated in association with the generated reception history control number (S208) and stored (S209).

When the user confirms the printed document, the control panel of the printer is operated to display the reception history list (S210), and an instruction to display the reception history list is sent to the print server (S211). The instructed print server displays the reception history list on the display section of the control panel (S212).

A desired reception history is selected from the displayed reception history list by the user by operating the control panel of the printer (S213), an instruction is sent to extract the selected reception history (S214), and the reception history selected by the print server is extracted from the list (S215). According to the information shown in the extracted reception history, a confirmation notice is generated (S216) and sent to the printing requesting source (S217).

When the confirmation notice is generated and sent, a state of the confirmation notice of the reception history is updated from "unreceived" to "received" (S218). The client PC having received the confirmation notice confirms the confirmation notice (S219).

Thus, the printing requested print data is printed normally, and the printing requesting source can confirm that the content of the printed document was checked by the user.

To authenticate more securely that the destination user has checked, it may be configured such that a password is determined for every user at the time of selecting the reception history, and after the password is approved, a confirmation notice on the reception history can be generated.

FIG. 3 is a structure view showing an example of the reception history.

The structure view shown in FIG. 3 shows the reception history which is stored in the reception history storage section 7 shown in FIG. 1 and displayed on the display section 11.

As items of the reception history to be stored, the shown are a reception history control number 301, a recipient address 302, a sender address 303, a return address 304, a received date and time 305, a data size 306 and a confirmation notice state 307. When the recipient address 302, the sender address 303 and the return address 304 show an e-mail address, it indicates that the print data is sent as the main body or attachment file of the e-mail.

Meanwhile, when an IP (Internet Protocol) address, a user name or the like is shown, it indicates that print data has been sent as ordinary printout.

The confirmation notice state 307 is an item indicating a state whether a printed document of print data is confirmed by the recipient and a confirmation notice is sent to the sender. For example, when "sent" is shown, it indicates a state that a confirmation notice has been sent, and when "unsent" is shown, it indicates a state that a confirmation notice has not been sent by a recipient though printout has been conducted.

FIG. 4A and FIG. 4B are views showing formats of sent and received data using the e-mail function.

FIG. 4A shows a data format of a printing request using the e-mail function, and FIG. 4B is a data format of a confirmation notice using the e-mail function.

FIG. 4A shows print data which is comprised of an e-mail header section 400, a data section 410 of print data and an error check code 420 of print data. The print data, which is requested to be printed, is wrapped as the main body or an attachment file of the data section 410.

The e-mail header section 410 is comprised of a recipient (destination) address 41, a sender address 42, a return address 43 and the like and used as information to generate the reception history.

FIG. 4B shows a confirmation notice which is comprised of an e-mail header section 430, a confirmation notice data section 440 and an error check code 450, and confirmation condition information indicating that the content is checked by a user is stored in the data section 440 and sent.

The e-mail header section 430 is comprised of a recipient address 44 of a destination to which the confirmation notice is sent and a sender address 45 which is a source of the confirmation notice, and the address data stored in the reception history is used. The data section 440 of the confirmation notice includes confirmation condition information 46 indicating that the content was confirmed.

Thus, the e-mail function can be used to make a printing request, and a confirmation notice to the printing request can be received.

Figure 5:
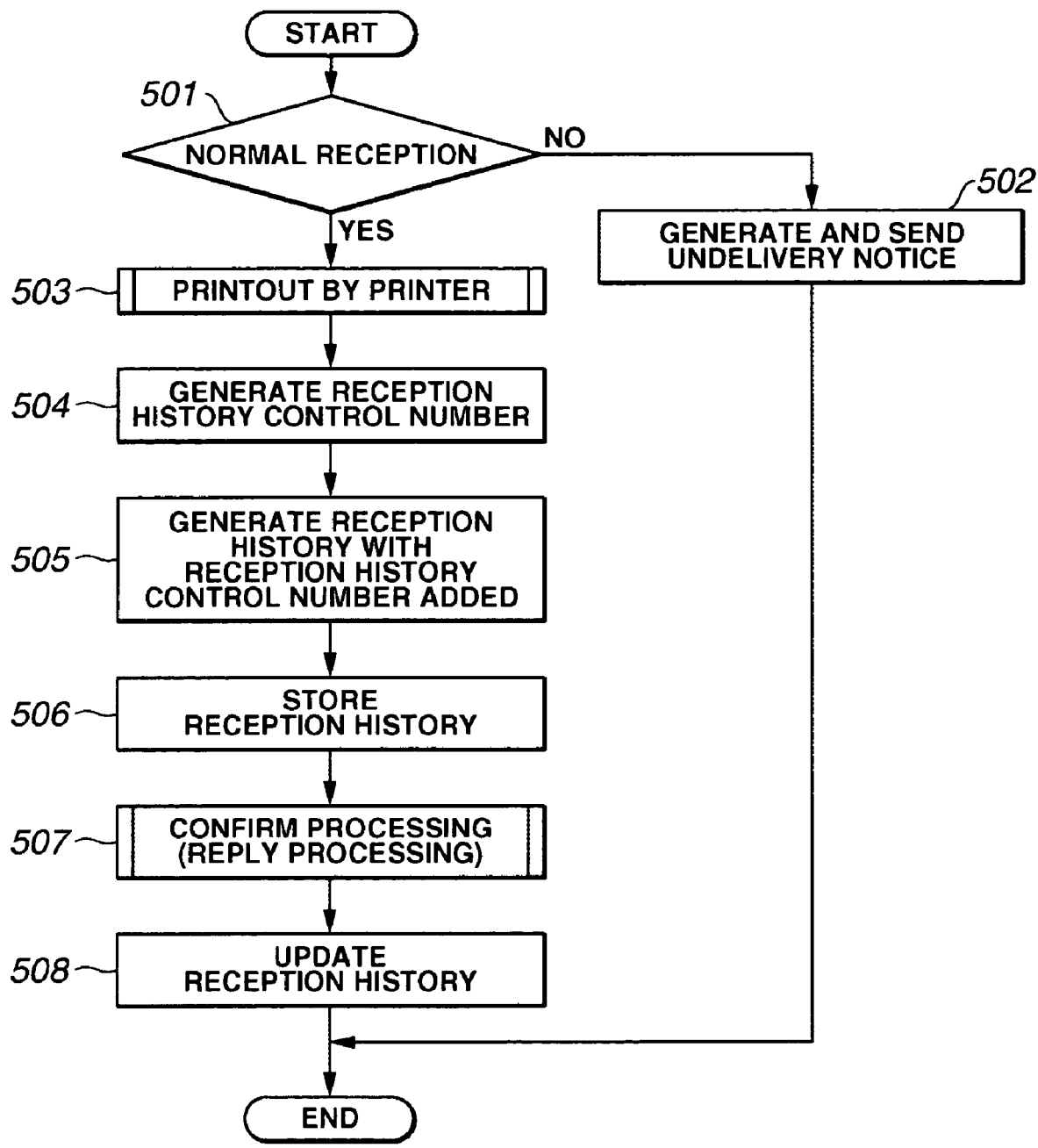
FIG. 5 is a flow chart showing a flow of processing to print out by an e-mail printing system of the present invention.

FIG. 5 is a flow chart showing a flow of processing to print out by an e-mail printing system of the present invention.

In FIG. 5, when a printing request is accepted by a print server, processing is started, it is judged whether print data is received normally (S501), and if not received normally (NO in S501), an undelivery notice is generated and sent back (S502). If received normally (YES in S501), printing of the print data is controlled to perform printout processing (S503). A reception history control number of the print data is generated (S504), and a reception history with the generated reception history control number added is generated (S505). The generated reception history is stored (S506), reply processing is performed (S507), and the reception history is updated (S508).

Figure 6:
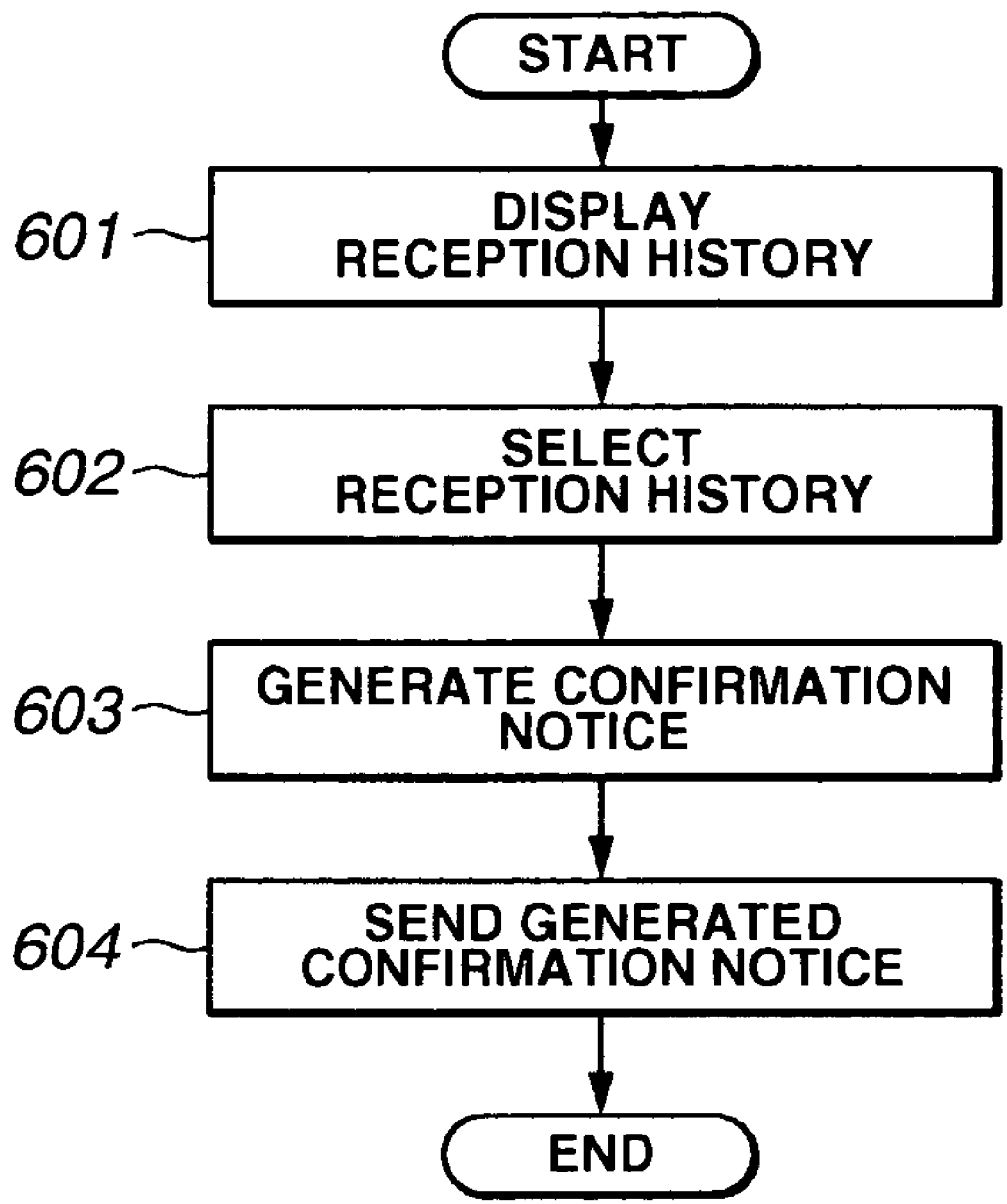
FIG. 6 is a flow chart showing a flow of reply processing by the e-mail printing system of the present invention.

The reply processing at that time is shown in detail in FIG. 6.

FIG. 6 is a flow chart showing a flow of reply processing of an e-mail printing system of the present invention.

In FIG. 6, when an instruction to display a reception history is made by a user, processing is started, and a reception history list is displayed (S601). A reception history of print data of which content is checked is selected from the displayed reception history (S602), and a confirmation notice of the reception history selected by the user is generated (S603). The generated confirmation notice is sent to the printing requesting source (S604).

Thus, according the flows shown in FIG. 5 and FIG. 6, it can be notified to the client PC that the content of a printed document was checked by the print server.

FIG. 7 is a sequence view of sending a confirmation notice by a printer.

FIG. 2 shows a sequence in the structure to perform the processing of the confirmation notice by the print server. FIG. 7 shows a sequence of processing the confirmation notice by the printer. FIG. 7 is similar to the sequence view of FIG. 2, so that it is used to illustrate the different points mainly. When print data generated by the client PC is sent to the printer (S202), the printer controls to print the print data and prints out (S701). Subsequently, a reception history control number used to manage the reception history of the print data which is printed out is generated (S206), and the reception history to be managed according to the generated reception history control number is generated (S208) and stored (S209).

When the printed document is checked by the user, the control panel which is co-disposed with the printer is operated to display the reception history list so as to select the reception history of the printed document (S210), and according to an instruction given by the operation to display the reception history list (S211), the reception history list is displayed (S212).

And, a desired reception history is selected from the displayed reception history list by the user's operation (S213), an instruction to extract the reception history selected by the selection operation is sent (S214), and a conforming reception history is extracted (S215).

A confirmation notice is generated according to the information of the reception history extracted as described above (S216), and a confirmation notice is sent to the client PC which is a printing requesting source (S217). When the notice is sent, an item indicating transmission conditions of the confirmation notice of the reception history is updated (S218). Thus, it is easy to confirm that the confirmation notice is sent when the reception history list is displayed by the printer.

When the confirmation notice is accepted, the client PC checks the accepted confirmation notice (S219).

According to the flow of processing described above, a reply operation to notify that the content is confirmed by the printer having printed out can be conducted, so that convenience is improved, and the confirmation notice can be sent more securely.

Embodiment 2

Figure 8:
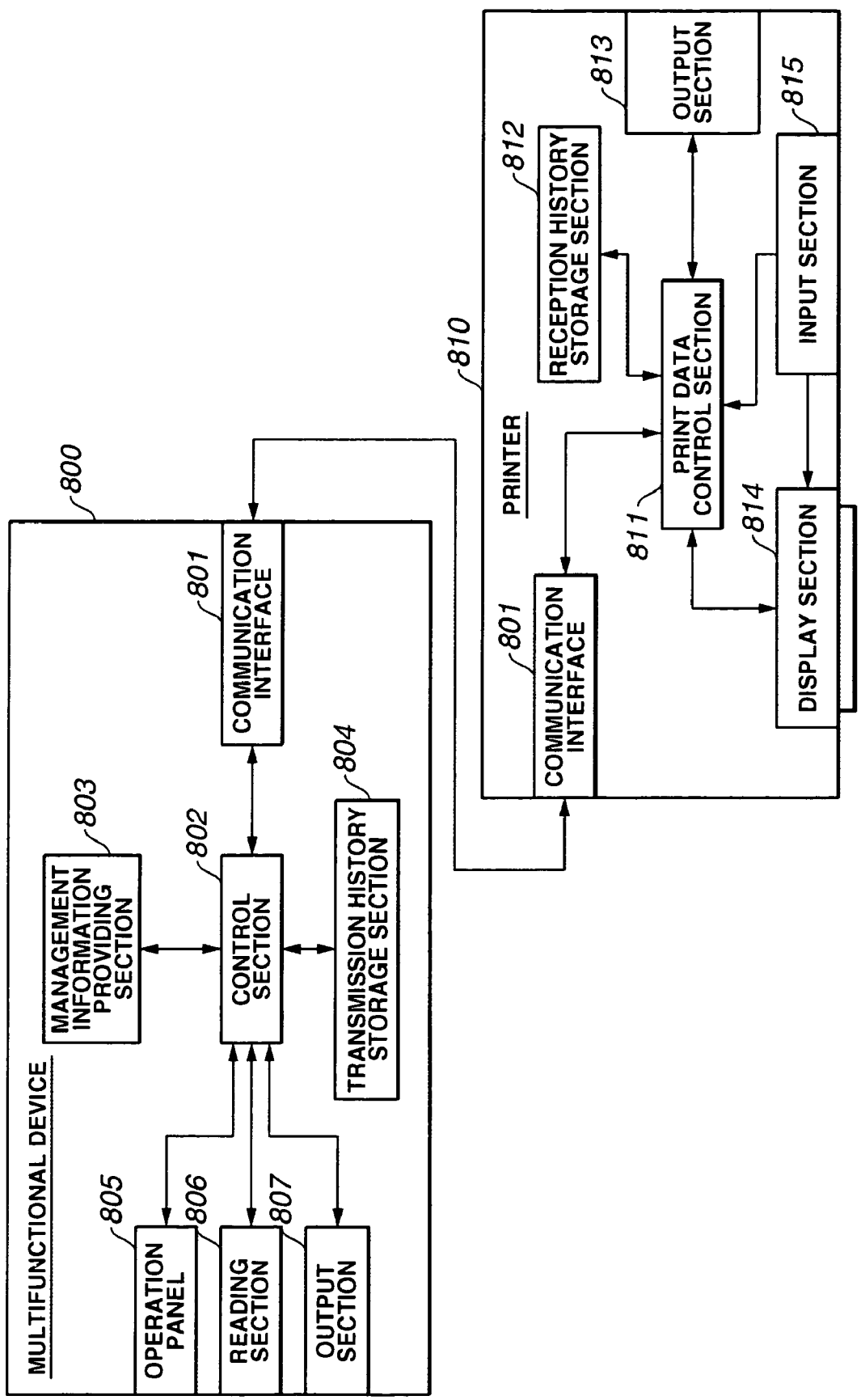
FIG. 8 is a block view of another example configured by applying the e-mail printing device, the e-mail printing system, the confirmation notifying method and the confirmation notifying program of the present invention.

FIG. 8 is a block view of another example configured by applying the e-mail printing device and system and the confirmation notifying method and the confirmation notifying program of the present invention.

FIG. 8 shows a configuration which includes a multifunctional device 800 which has an Internet facsimile function and a network scan function and a printer 810 that outputs a printed document, and the multifunctional device 800 and the printer 810 can be local-connected by a USB cable or the like or network-connected by an Ethernet (registered trademark) cable or the like.

For example, when configured as described above, printout can be made by scanning a printed document by a network scanning function of the multifunctional device 800 and sending the computerized electronic document to the printer 810 over the above-described cable.

The multifunctional device 800 includes a communication interface 801, a control section 802, a management information providing section 803, a transmission history storage section 804, an operation panel 805, a reading section 806 and an output section 807.

The communication interface 801 is a communication interface which realizes the above-described local connection and network connection.

The control section 802 realizes the Internet facsimile function and the network scanning function and controls the multifunctional device 800 as a whole. According to an instruction from the user using the operation panel 805, the control section 802 sends an instruction to the individual component elements and performs processing according to the information input via the communication interface 801.

When a printed document is read by the reading section 806 to realize the Internet facsimile function and the network scanning function, an instruction to generate and give management information to be given to print data, which is requested to be printed, is sent to the management information providing section 803.

In addition, a transmission history is generated by sending the print data provided with management information to the printer 810 via the communication interface 801. At this time, the transmission history is generated with the management information included in addition to the destination, the sent date and time and the like, and the management information is designated, so that the transmission history of print data can be specified. The generated transmission history is stored in the transmission history storage section 804.

Besides, when a confirmation notice indicating that the printed document output by the printer 810 is confirmed by the user is received, the confirmation notice is analyzed, the management information is identified to specify the transmission history stored in the transmission history storage section 804, and it is compared with the management information held by the transmission history.

When the confirmation notice is received, the transmission history of the print data stored by the transmission history storage section 804 is updated.

The management information providing section 803 gives the management information to the print data which is printed by the printer 810 via the control section 802. At this time, the management information indicates information for management of the sent content, information capable of specifying the transmission history stored in the transmission history storage section 804 and any information generated by the multifunctional device 800.

Instead of giving the management information to print data to be printed, a printing request may be made as a print job different from the print data.

The transmission history storage section 804 stores a transmission history (required history) of print data about which a printout request is made to the printer 810. The transmission history is generated by the control section 802 when a printout request is sent to the printer 810, and it is stored in association with the management information given by the management information providing section 803. The use of the management information allows to specify the transmission history of print data about which a printing request is made.

The operation panel 805 is comprised of an input section such as buttons and arrow keys, a display section such as an LCD and a touch panel that combines the above sections, and it is a user interface which transmits an instruction form a user to the multifunctional device 800. The operation panel 805 can display the transmission history stored in the transmission history storage section 804 and can make various settings such as an Internet facsimile function and a network scanning function which are realized by the control section 802.

The reading section 806 is comprised of a scanner or an OCR (Optical Character Reader) and reads a printed document. To realize the Internet facsimile function and the network scanning function, both the functions perform reading by the reading section 806 to computerize the printed document.

The output section 807 denotes an engine for printout as a multifunctional device.

By configuring as described above, the transmission history is managed by the multifunctional device which is on the transmitting side, so that the reception of the confirmation notice can be checked by the multifunctional device. Accordingly, the content of the printed document can be transmitted to the destination user more securely.

Figure 9:
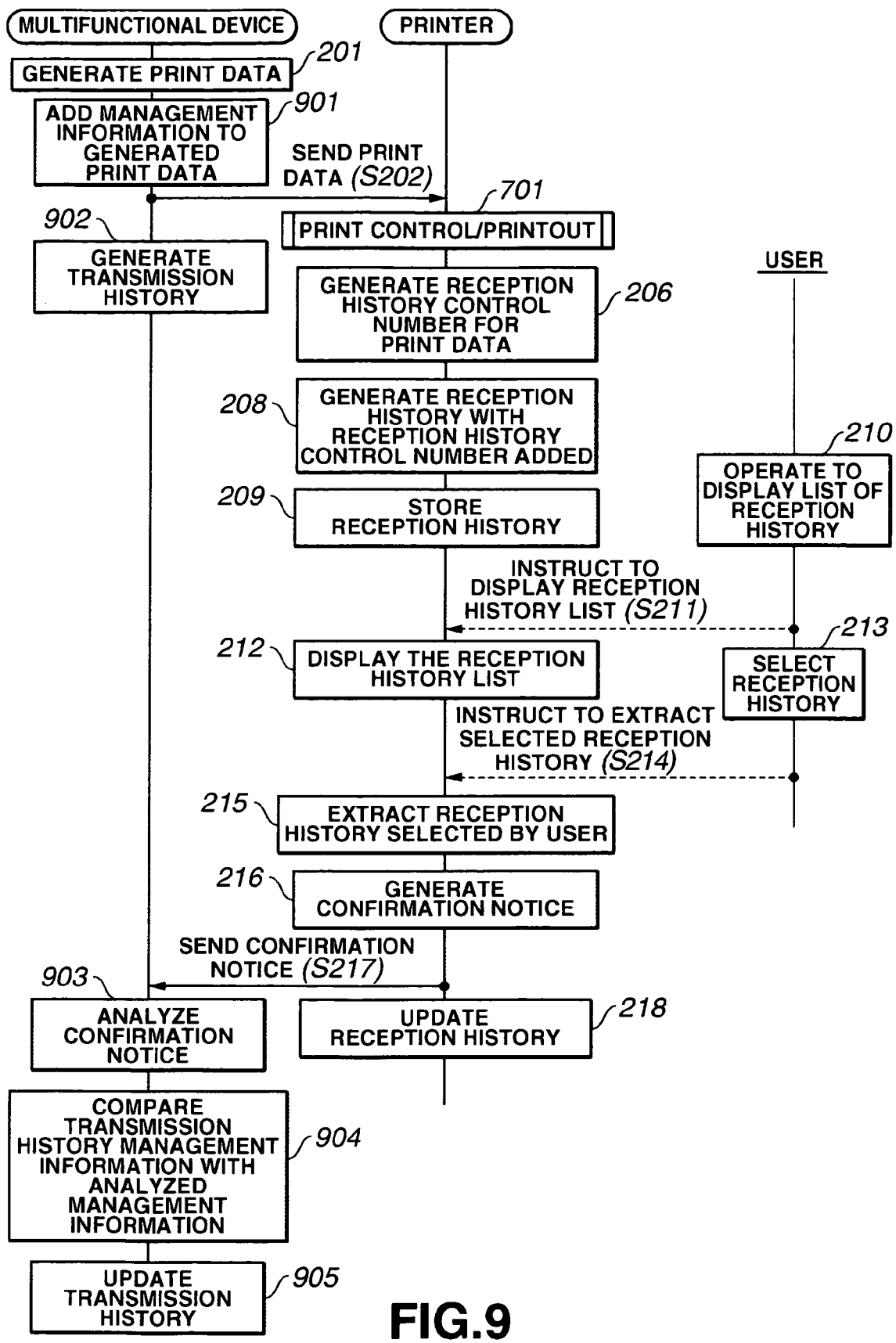
FIG. 9 is a flow chart showing a flow of checking the content according to the structure of FIG. 8.

FIG. 9 is a flow chart showing a flow of checking the content according to the structure of FIG. 8.

FIG. 9 is similar to FIG. 7 and its different sections will be described mainly. When print data to be printed by the printer is generated from the printed document read by the reading section of the multifunctional device or the like (S201), management information is added to the generated print data (S901). The print data with the management information added is sent to the printer (S202), and the steps 701 and 206 through 218 shown in FIG. 7 are conducted.

Upon receiving the confirmation notice from the printer, the multifunctional device analyzes the confirmation notice (S903) and identifies the management information contained in the confirmation notice. The transmission history of the print data is specified from the identified management information, and the management information of the transmission history and the management information possessed by the specified transmission history are compared (S904). If they match as a compared result, the transmission history is updated.

For example, [confirmation notice received or not] which indicates whether or not a confirmation notice which is one item of the transmission history is received is updated from "unreceived" to "received".

Thus, the print data transmitting side can know a printout state and a content check state more securely.

FIG. 10 is a view showing an example of a transmission history.

In FIG. 10, the transmission history is comprised of management information 1001, a print requested date and time 1002, a destination 1003, confirmation notice received or not 1004 and a confirmation notice received date and time 1005. When a printing request is made, it is stored together with the management information which is generated by the control section shown in FIG. 8 and added to the print data by the management information providing section.

The management information 1001 indicates the management information shown in FIG. 8, and the print requested date and time 1002 indicates date and time when the printing request is made to the printer.

The destination 1003 indicates a printing requested side, the confirmation notice received or not 1004 indicates whether or not a confirmation notice from the printer has been received, and the confirmation notice received date and time 1005 indicates received date and time when a value of the confirmation notice received or not 1004 is "received".

The transmission history is displayed by making a transmission history display instruction from the operation panel 805 of FIG. 8.

Through the above described process, the print data, which is requested to be printed, is normally printed by the print control system of the present invention, and the confirmation of a printed document of the print data by the user can be recognized by the printing requesting source.

Therefore, by applying the present invention, even when the functions such as the Internet facsimile function and the network scanner function to printout at the destination are used, the user can confirm securely, so that a confirming job using another means such as a telephone, an instant messenger or the like is not necessary, and the effects that convenience is improved and processing can be conducted quickly can be expected.

The process indicated by the flow chart can also be realized by a confirmation notifying program which can be realized by a computer.

As described above, an aspect of the present invention provides an e-mail print processing device that performs printing of an e-mail and a file attached to the e-mail received via a network, including: a reception history storage unit that stores a reception history of e-mails; a display unit that displays a list of the reception history of the e-mails stored in the reception history storage unit; a selection unit that selects by a user's operation an e-mail of which printing is confirmed from the reception history list of the e-mails displayed by the display unit; a confirmation notice generation unit that generates a confirmation notice of the e-mail selected by the selection unit; and a confirmation notice sending unit that sends the confirmation notice generated by the confirmation notice generation unit.

A second aspect of the present invention provides the e-mail print processing device according to the first aspect of the invention, in which the reception history storage unit manages the reception history of the e-mails by adding an address of a sender of an e-mail, an address of a confirmation informant and a recipient address to the reception history, and the confirmation notice sending unit sends the confirmation notice to any of the e-mail sender address, the confirmation informant address and the recipient address.

A third aspect of the present invention provides the e-mail print processing device according to the first or second aspect of the invention, in which the e-mail and the file attached to the e-mail are printed with management information of the reception history of the e-mail stored by the reception history storage unit added.

A fourth aspect of the present invention provides an e-mail printing system that performs printing of an e-mail and a file attached to the e-mail received from a device on an e-mail sender side via a network by an e-mail print processing device and confirms them, in which the e-mail print processing device includes: a reception history storage unit that stores a reception history of e-mails; a display unit that displays a list of the reception history of the e-mails stored in the reception history storage unit; a selection unit that selects by a user's operation an e-mail of which printing is confirmed from the reception history list of the e-mails displayed by the display unit; a confirmation notice generation unit that generates a confirmation notice of the e-mail selected by the selection unit; and a confirmation notice sending unit that sends the confirmation notice generated by the confirmation notice generation unit, and in which: a device that receives the confirmation notice sent by the confirmation notice sending unit includes: a storage unit that stores a reception history of the received confirmation notice; and a display unit that displays by a user's operation the reception history of the confirmation notice stored in the storage unit.

A fifth aspect of the present invention provides the e-mail printing system according to the fourth aspect of the invention, in which the e-mail sender-side device includes: a transmission history management unit that manages the transmission history of the e-mail, and a confirmation unit that confirms the e-mail according to the transmission history by comparing the confirmation notice sent by the confirmation notice sending unit and the transmission history managed by the transmission history management unit.

A sixth aspect of the present invention provides a confirmation notifying method in an e-mail print processing device to print an e-mail and a file attached to the e-mail received via a network, including: storing a reception history of e-mails by a reception history storage unit; displaying, by a display unit, a list of the reception history of the e-mails stored in the reception history storage unit; selecting, by a selection unit operated by a user, an e-mail of which printing is confirmed from the reception history list of the e-mails displayed by the display unit; generating, by a confirmation notice generation unit, a confirmation notice of the e-mail selected by the selection unit; and sending, by a confirmation notice sending unit, the confirmation notice generated by the confirmation notice generation unit.

A seventh aspect of the present invention provides a storage medium readable by a computer, the storage medium storing a confirmation notifying program of instructions executable by the computer to perform a function for making a confirmation notice of an e-mail print processing device that performs printing of an e-mail and a file attached to the e-mail received via a network, the function including: storing a reception history of e-mails; displaying a list of the reception history of the stored e-mails; selecting, by a user's operation, an e-mail of which printing is confirmed from the displayed reception history list of the e-mails; generating a confirmation notice of the selected e-mail; and sending the generated confirmation notice.

According to the above-mentioned aspects of the present invention, since it is so configured that a reception history of the received print data is stored, the reception history of the received print data is selected from the stored reception history and the confirmation notice is sent to the printing requesting source, the present invention realizes an advantageous effect that the sender can recognize that the received print data is output normally and the output printed document is confirmed by the recipient without fail.

The present invention is not limited to the embodiment described above and shown in the drawings and various modifications may be made without deviating from the spirit and scope of the invention.

The present invention can be applied to an e-mail printing device, an e-mail printing system, a confirmation notifying method and a confirmation notifying program that output is made by printout by the Internet facsimile function or the network scanner function or printout or the like of the main body or the attachment file of an e-mail and the printed result is checked by the sender, and the invention is particularly useful to make authentication by the sender that the content of the printed document is confirmed by the recipient without fail.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-12816 filed on Jan. 20, 2005 including specification, claims, drawings and abstract is incorporated herein by reference in its entirety.

What is claimed is:

1. A printing system using an e-mail to request printing, comprising:
a printer;
a client terminal that makes a printing request to the printer; and
a print server that controls printing in the printer according to the printing request from the client terminal, wherein:
the client terminal makes the printing request by writing print data related to the printing request in a main body or an attachment file of an e-mail and sending the e-mail to the print server, and
the print server comprises:
a print instruction unit that performs a print instruction by sending the print data written in the e-mail received from the client terminal to the printer;
a printout completion notice receiving unit that receives a printout completion notice of the print data according to the print instruction by the print instruction unit from the printer;
a reception history storage unit that stores a reception history of an e-mail related to the printout completion notice received by the printout completion notice receiving unit;
a display that displays, after the printout completion notice receiving unit receives the printout completion notice, a list of the reception history stored in the reception history storage unit according to a user's operation;
a confirmation notice generation unit that generates a confirmation notice corresponding to a reception history when the reception history is selected by a user's operation from the list of the reception history displayed on the display, and that generates no confirmation notice when the reception history is not selected; and
a confirmation notice sending unit that sends the confirmation notice generated by the confirmation notice generation unit to a confirmation notice destination to which the confirmation notice related to the printing request is to be sent, wherein when the confirmation notice is sent to the confirmation notice destination, the state of the reception history is updated from an unreceived state to a received state, the received state indicating that the print data has been normally printed on a document and that the printed document has been checked by the user.

2. The printing system according to claim 1, wherein:
the reception history storage unit manages a sender address of the e-mail, a recipient address of the e-mail and a return address corresponding to the confirmation notice destination, and
the confirmation notice sending unit sends the confirmation notice to any one of the sender address, the recipient address and the return address.

3. A print server that receives an e-mail, in a main body or an attachment of which print data related to a printing request sent from a client terminal is written, and controls printing in a printer according to the print data, the print server comprising:
a print instruction unit that performs a print instruction by sending the print data written in the e-mail received from the client terminal to the printer;
a printout completion notice receiving unit that receives a printout completion notice of the print data according to the print instruction by the print instruction unit from the printer;
a reception history storage unit that stores a reception history of an e-mail related to the printout completion notice received by the printout completion receiving unit;
a display that displays, after the printout completion notice receiving unit receives the printout completion notice, a list of the reception history stored in the reception history storage unit according to a user's operation;
a confirmation notice generation unit that generates a confirmation notice corresponding to a reception history when the reception history is selected by a user's operation from the list of the reception history displayed on the display, and that generates no confirmation notice when the reception history is not selected; and
a confirmation notice sending unit that sends the confirmation notice generated by the confirmation notice generation unit to a confirmation notice destination to which the confirmation notice related to the printing request is to be sent, wherein when the confirmation notice is sent to the confirmation notice destination, the state of the reception history is updated from an unreceived state to a received state, the received state indicating that the print data has been normally printed on a document and that the printed document has been checked by the user.

4. A printing system using an e-mail to request printing, comprising:
a printer; and
a printing request terminal that makes a printing request to the printer,
wherein:
the printing request terminal makes the printing request by writing print data related to the printing request in a main body or an attachment file of an e-mail and sending the e-mail to the printer, and
the printer comprises:
a print controller that controls printing according to the print data written in the e-mail received from the printing request terminal;
the printing request terminal comprises:

a printout completion notice receiving unit that receives a printout completion notice of the print data according to the printing request by the print request terminal from the printer;
a reception history storage unit that stores a reception history of the e-mail for which printing of the print data by the print controller is completed;
a display that displays, after the printout completion notice receiving unit receives the printout completion notice, a list of the reception history stored in the reception history storage unit according to a user's operation;
a confirmation notice generation unit that generates a confirmation notice corresponding to a reception history when the reception history is selected by a user's operation from the list of the reception history displayed on the display, and that generates no confirmation notice when the reception history is not selected, and
a confirmation notice sending unit that sends the confirmation notice generated by the confirmation notice generation unit to a confirmation notice destination to which the confirmation notice related to the printing request is to be sent, wherein when the confirmation notice is sent to the confirmation notice destination, the state of the reception history is updated from an unreceived state to a received state, the received state indicating that the print data has been normally printed on a document and the printed document has been checked by the user.

5. The printing system according to claim 4, wherein:
the reception history storage unit manages a sender address of the e-mail, a recipient address of the e-mail and a return address corresponding to the confirmation notice destination, and
the confirmation notice sending unit sends the confirmation notice to any one of the sender address, the recipient address and the return address.

6. The printing system according to claim 4, wherein the printing request terminal comprises:
a transmission history management unit that manages a transmission history of the e-mail, and
a confirmation unit that confirms the e-mail according to the transmission history by comparing the confirmation notice sent by the confirmation notice sending unit and the transmission history managed by the transmission history management unit.

7. The printing system according to claim 4, wherein the printing request terminal is a multifunctional device which comprises:
a reading unit that reads a printed document;
a control unit that generates, from the read printed document, print data to be printed out by the printer and generates management information in correspondence with the generated print data;
a management information providing unit that provides the management information to the print data to be printed out by the printer; and
a transmission history storage unit that stores, in association with the management information provided to the print data, a transmission history of the print data of which transmission has completed, after the print data provided with the management information was sent as a print request to the printer,
the confirmation notice generation unit of the printer generates the confirmation notice including the management information corresponding to the reception history, and
when the multifunctional device receives the confirmation notice from the printer, the control unit of the multifunctional device compares the management information included in the reception history received from the printer and the management information corresponding to the transmission history stored in the transmission history storage unit of the multifunctional device, and updates the transmission history of which management information has matched from an unreceived state to a received state.

* * * * *